United States Patent
Pedersen et al.

(10) Patent No.: US 6,952,578 B1
(45) Date of Patent: Oct. 4, 2005

(54) CELLULAR COMMUNICATION TERMINAL, A METHOD AND A SYSTEM FOR ACCESSING SERVERS

(75) Inventors: Claus Pedersen, Vallensbaek (DK); Bjarne Vestergaard, Aarhus (DK)

(73) Assignee: Nokia Corporation, Espoo (FI)

( * ) Notice: Subject to any disclaimer, the term of this patent is extended or adjusted under 35 U.S.C. 154(b) by 305 days.

(21) Appl. No.: 10/009,297

(22) PCT Filed: Jun. 7, 2000

(86) PCT No.: PCT/IB00/00826

§ 371 (c)(1),
(2), (4) Date: Jul. 1, 2002

(87) PCT Pub. No.: WO00/76172

PCT Pub. Date: Dec. 14, 2000

(30) Foreign Application Priority Data

Jun. 7, 1999 (GB) .................................... 9913193
Oct. 26, 1999 (GB) .................................... 9925334

(51) Int. Cl.[7] .......................... H04Q 7/20; H04M 1/00; G06F 15/16
(52) U.S. Cl. .............................. 455/414.2; 455/414.1; 455/414.3; 455/426.1; 455/426.2; 455/557; 455/558; 709/203
(58) Field of Search .......................... 455/414.2, 414.3, 455/414.1, 412.1, 426.1, 426.2, 445, 466, 455/556.1, 556.2, 557, 558; 370/401; 709/203, 709/201, 217, 218, 219, 229, 249–252; 707/10

(56) References Cited

U.S. PATENT DOCUMENTS 5,812,776 A * 9/1998 Gifford ........................ 709/217
6,085,193 A * 7/2000 Malkin et al. ................. 707/10
6,457,060 B1 * 9/2002 Martin et al. ................ 709/245
6,473,609 B1 * 10/2002 Schwartz et al. ........... 455/406
6,560,640 B2 * 5/2003 Smethers ..................... 709/219
6,742,022 B1 * 5/2004 King et al. .................. 709/219

FOREIGN PATENT DOCUMENTS

WO 99/17227 4/1999 .......... G06F 17/30
WO 00/76172 A1 12/2000 .......... H04L 29/06

(Continued)

OTHER PUBLICATIONS

Sietmann, R., "Mobil Ins Internet. Wireless Application Protocol Adaptiert Mobiltelefone Fuer Das WWW", *CT Magazin Fuer Computer Technik*, De, Verlag Hainz Heisse GmbH, No. 4, 1998, pp. 202-207, XP000732823, ISSN: 0724-8679.

* cited by examiner

*Primary Examiner*—Duc M. Nguyen
(74) *Attorney, Agent, or Firm*—Antonelli, Terry, Stout & Kraus, LLP

(57) ABSTRACT

A system, a method, and a cellular communication terminal for accessing servers. The cellular communication terminal is arranged with a receiver and a transmitter, to receive and transmit data packets from at least one server through links. The links are arranged to forward the data packets between the terminal and the server. The terminal is further arranged with a first memory comprising an identifier and at least one item. The item is provided with an access point, which indicates the location of the server to be accessed. The server is accessed by sending the access point and the identifier to the link to identify the content to be accessed. A browser application is arranged in the terminal, to establish a session to at least a first link, by reading an item from the first memory. Also, the terminal has a user interface connected to the browser application. The user interface comprises display means for displaying content and user input means to control the browser application.

32 Claims, 7 Drawing Sheets

CELLULAR COMMUNICATION TERMINAL, A METHOD AND A SYSTEM FOR ACCESSING SERVERS

BACKGROUND OF THE INVENTION

1. Field of the Invention

The invention relates to a cellular terminal, method and a system for accessing different servers from a cellular terminal.

2. Description of the Prior Art

The Wireless Application Protocol (WAP) is a result of continuous work to define an industry wide standard for developing applications over cellular communication networks. This makes it possible to access for example the Internet or other kind of information networks provided with hypermedia servers, from an ordinary cellular phone supporting WAP. These types of cellular phones which support WAP, have only a small fraction of the resources of a typical desktop or portable computer. This means that the features in the phone are very limited compared to a computer. The reason for this limitation is the size of the phones, i.e., the phone has a severe limitation in processing power, memory space, display size and buttons or keys by which a user can request, view and manipulate information obtained from a hypermedia server. Therefore, it is very important that the features in the phone are made as efficient as possible. Also, the relatively high cost for a call from a cellular phone makes it also very important to provide the client with a fast response from the server.

The WAP Architecture is very similar to the Internet Architecture. FIG. 1 shows a comparison between the Internet Architecture 10 and the WAP Architecture 20. The Internet Architecture 10 comprises a Hypertext Markup Language (HTML) 12, e.g., Java Script, a Hypertext Transfer Protocol (HTTP) 14, Transport Layered Security (TLS)/Secure Sockets Layer (SSL) 16, and a Transport Configuration Protocol (TCP)/User Datagram Protocol (UDP) 18. The Internet Architecture 10 is well known prior art, and is disclosed in, e.g., U.S. Pat. No. 5,657,390. The WAP Architecture 20 comprises a Wireless Application Protocol (WAE) 22 corresponding to HTML 12, a Wireless Session Layer (WSP) 24 corresponding to HTTP 14, a Wireless Transport Layered Security (WTLS) 26 corresponding to TLS/SSL 16, and a Wireless Transport Layer (WTP) 28 corresponding to TCP/UDP 18. Furthermore, the WAP Architecture comprises different bearers 29 like, e.g., SMS, USSD and CDMA 30. Other devices and applications are indicated as reference number 21. There is also a possibility to implement different kinds of services and applications in the WAP Architecture, e.g., Value Added Services (VAS). The WAP Architecture 20 is well known prior art and is therefore not being disclosed any further. More detailed information about WAP can at present be found at the following Internet address: http://www.wapforum.org/.

When using a WAP browser today, the session is normally between a dedicated gateway, connected to a server, and a client like a cellular phone. A gateway can be a computer that lies at the intersection of a server to be accessed and a client, and routes traffic from one or several servers to the client. Thus, the gateway provides a link between two disparate types of electronic communications such as the WAP architecture and the Internet architecture. If the user would like to access a remote server, i.e., a server which is located elsewhere than the server connected to the dedicated gateway, the access can in some way be restricted, or in some cases not allowed. For example, a user would like to receive information about his/her flight points from an airline company, which can be accessed through another gateway than the dedicated gateway. In this case, the browser in the phone will normally first establish a connection to the dedicated gateway. Then, the dedicated gateway will detect that the request is to another gateway than the dedicated gateway. This means that the browser application should initiate a linking application, e.g., a gateway application, in order to establish a session to the other gateway. The user must today confirm this request to initiate the session to the other server, and provide the browser with input of the location of the other gateway. Now, the phone can first establish a connection to the dedicated gateway, which in turn will cause the gateway to send a pull/push to the other gateway for the requested homepage, comprising the user's flight points. However, this means that the user must be provided with many different linking applications, e.g., one for each gateway, which accordingly takes up valuable memory space in the already limited space in a cellular phone.

Also, when browsing to an address on a network server, which is situated elsewhere than the dedicated gateway, the user should confirm this entry and register this on his/her radio terminal every time a session is going to be established to the other server. This confirmation/registration procedure is intended to be some kind of alert to the user when he/she is switching from one gateway to another, but this will cause a delay in the response and requires that the user confirms this as well. Therefore, there is a need to make a faster and simplified connection to the WAP server which provides the requested information to the user.

The present invention provides a faster response to a user of a cellular telecommunication terminal supporting browsing facilities, like a cellular phone, which allow the user to be free from or at least minimize interaction, when accessing servers that is accessed through other links than the dedicated links.

According to a first aspect of the present invention, there is provided a cellular communication terminal for accessing servers (320–360), the terminal comprising a receiver and a transmitter (19) arranged to receive and transmit data packets from at least one server (320,340) through a link (360) arranged to forward the data packets between the terminal (1,300) and the server (320,340);

a first memory (16,17b) comprising an identifier and at least one item, the item is provided with an access point which indicates the location of the server (320,340) to be accessed, wherein the server (320,340) is accessed by sending the identifier to the link (360) to identify the content to be accessed at the server (320,340);

a browser application, arranged to establish a session to at least a first link (360) by reading an item from the first memory (16,17b), and a user interface (2,3,4,5,6) connected to the browser application having display (3) for displaying content received from the server (320,340) and user input (2,4,5) to control the browser application, characterised in that the browser application is arranged dynamically, such that if the access point indicates a location to a second link (330) giving access to the server (340), the browser application will automatically activate the transmitter (19) to send a request to the first link (360) to access the server (340) through second link (330), in order to allow the user to be free from interaction when accessing other servers that is accessed through other links than the first link.

According to a further aspect of the invention, there is provided a method for accessing servers through a cellular communication terminal (1,300), the communication terminal comprising a first memory (16,17*b*) and a browser application, wherein the method comprises the following steps:

reading an item (510) in the first memory (16,17*b*) and an identifier, by means of the browser application, the item comprising at least one access point indicating the location of a server (320,340) to be accessed;

generating a request (520) by means of the browser application, the request comprising information of the requested access point, and the identifier identifies the content of the requested access point, initiating a session to a first link (360), by forwarding the request from the communication terminal (1,300) to the first link (360), the link sending data packets between the terminal (1,300) and the server (320,340), identifying the request (550) at the first link (360), and establishing a session between the terminal (1,300) and the first link (360) by sending a response from the first link to the terminal, characterised in that the browser application is dynamic, such that if the access point is indicating a location to a second link (330) giving access to the server (340), the browser application is automatically activating a transmitter (19) by sending a request to the first link (360), forwarding the request to the second link (330) and providing access (580) to the server (340), in order to allow the user to be free from interaction when accessing other servers that is accessed through other links than the first link.

According to a still further aspect of the invention, there is provided a system (301) for accessing servers (320–360), the system (301) comprising a cellular communication terminal (1,300) including:

a receiver and a transmitter (19) which receives and transmits data packets from at least one server (320, 340) through link (360) arranged to forward the data packets between the terminal (1,300) and the server (320,340);

a first memory (16,17*b*) comprising an identifier and at least one item, the item is provided with an access point which indicates the location of the server (320,340) to be accessed, wherein the server (320, 340) is accessed by sending the access point and the identifier to the link (360) to identify the content to be accessed;

a browser application, which establishes a session to at least a first link (360) by reading an item from the first memory (16,17*b*), and a user interface (2,3,4,5,6) connected to the browser application, having display (3) for displaying content and user input (2,4,6) to control the browser application, a cellular communication network (310), which establishes a connection (305) between the cellular communication terminal (1,300) and link (360), at least one first link (360), which enables a session for the cellular communication terminal (1,300) and to forward data packets between the terminal and a server (320,340), and at least one server (320,340), which receives and/or transmits data packets from/to the terminal (1,300), characterised in that the browser application is arranged dynamically, such that if the access point indicates a location to second link (330) giving access to the server (340), the browser application will automatically activate the transmitter (19) to send a request to the first link (360) to access the server (340) through second link (330), in order to allow the user to be free from interaction when accessing other servers that is accessed through other links than the first link.

According to a yet further aspect of the invention, there is provided a communication device for accessing a server accessible via a proxy, the device comprising a transceiver, the transceiver being operable to establish a session with a proxy, the proxy allowing access to the server such that where a further proxy provides access to the server, a connection is first formed between the proxies.

The further proxy may allow access to a secure server whose address is returned by a server accessed from the proxy with which the transceiver has established a session. By allowing access to the secure server through the connection between the proxies, the user is relieved from the requirement to establish a new session to access the secure server. This has particular advantage where a user initially wishes to access the general content of an on-line bank for example and then wishes to obtain confidential information relating to their account.

A particular advantageous embodiment, is to provide the terminal with a script, which will provide provisions for accessing servers through links. This means that it can be possible to save valuable memory space in the terminal, since the terminal does not have to be provided with the different provisions which is required to access different links, like a gateway or a proxy. A provision can be a linking application, which a certain gateway requires to establish a session. Then the browser can, by means of the script, pull a linking application from a gateway, and activate the linking application, after the application is pushed to the terminal. The pull and push process in this case could be a downloading process activated by the terminal. Thus, the application would be much more flexible and could easily be redefined, without the user having to be worried about changes or updates in the application that is the user will be free from interaction when accessing other servers that is accessed through other links than the first link. Advantageously, the user is able to navigate rapidly among different links, which makes it possible for the user to choose between more or less fast servers.

BRIEF DESCRIPTION OF THE DRAWINGS

The invention will be described in greater detail in the following by way of example only and with reference to the attached drawings, in which.

DESCRIPTION OF THE PREFERRED EMBODIMENTS

Figure 1:
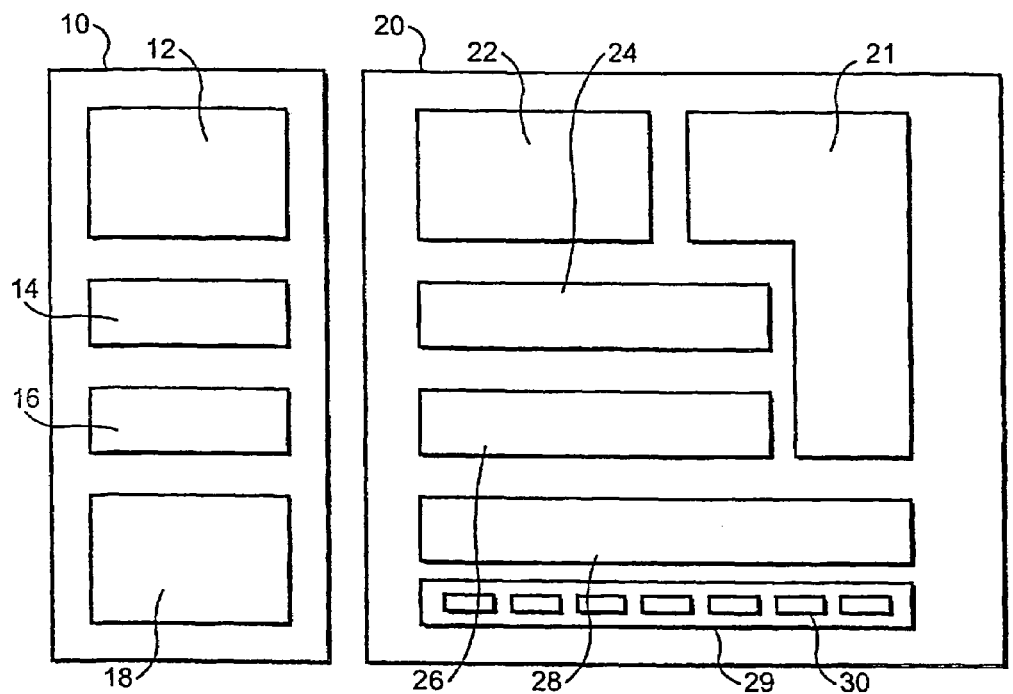
FIG. 1 shows a comparison between the Internet Architecture and the WAP Architecture.
Figure 2:
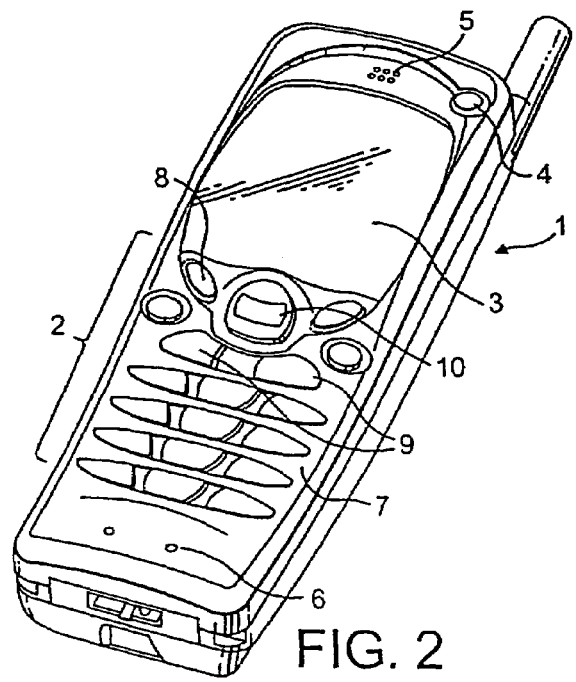
FIG. 2 schematically illustrates a preferred embodiment of a hand portable phone according to the present invention, FIG. 3 schematically shows the essential parts of a telephone for communicating with a cellular or cordless network, FIG. 4 schematically shows a connection between a communication terminal and different links according to a preferred embodiment according to the present invention.

FIG. 2 shows a preferred embodiment of a cellular communication terminal, hereafter also referred to as a phone, according to the present invention. The phone, which is generally designated by 1, comprises a user interface having a keypad 2, a display 3, an on/off button 4, a speaker 5, and a microphone 6. The phone 1 according to the preferred embodiment communicates via a cellular telecommunication network, e.g., a cellular network. However, the phone could also have been designed for a cordless network. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0–9" or a sign "#" or "*", respectively. In alpha mode each key is associated with a number of letters and special signs used in text editing. The keypad 2 additionally comprises two soft keys 8, two call handling keys 9, and a navigation key 10.

The two soft keys 8 have a functionality corresponding to what is known from the phones Nokia 2110™, Nokia 8110™ and Nokia 3810™. The functionality of the soft key depends on the state of the phone and the navigation in the menu by using a navigation key. The present functionality of the soft keys 8 is shown in separate fields in the display 3 just above the keys 8.

The two call handling keys 9 according to the preferred embodiment are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key by simply pressing the up/down key using his/her thumb, i.e., it allows the user to scroll between a group of items in, e.g., a menu provided in the user interface. Since many experienced phone users are used to one-hand control, it is a very good solution to place an input key, requiring precise motor movements. Thus, the user may place the phone in the hand between the finger tips and the palm of the hand. Hereby, the thumb is free for inputting information. In another embodiment, the scroll key can be a roller key (not shown), which is arranged to rotate in one or several directions. The roller allows the user to roll the key to scroll between different items in a menu. In case of a roller key, the soft key 8 could be arranged to the roller, i.e., upon pressing on the roller the same functionality, as the operation key has, could be entered. The roller key has a functionality corresponding to what is known from, e.g., the phone Nokia 7110™, which also supports the Wireless Application Protocol (WAP). The roller key is incorporated by reference in U.S. Pat. No. 6,097,964.

Figure 3:
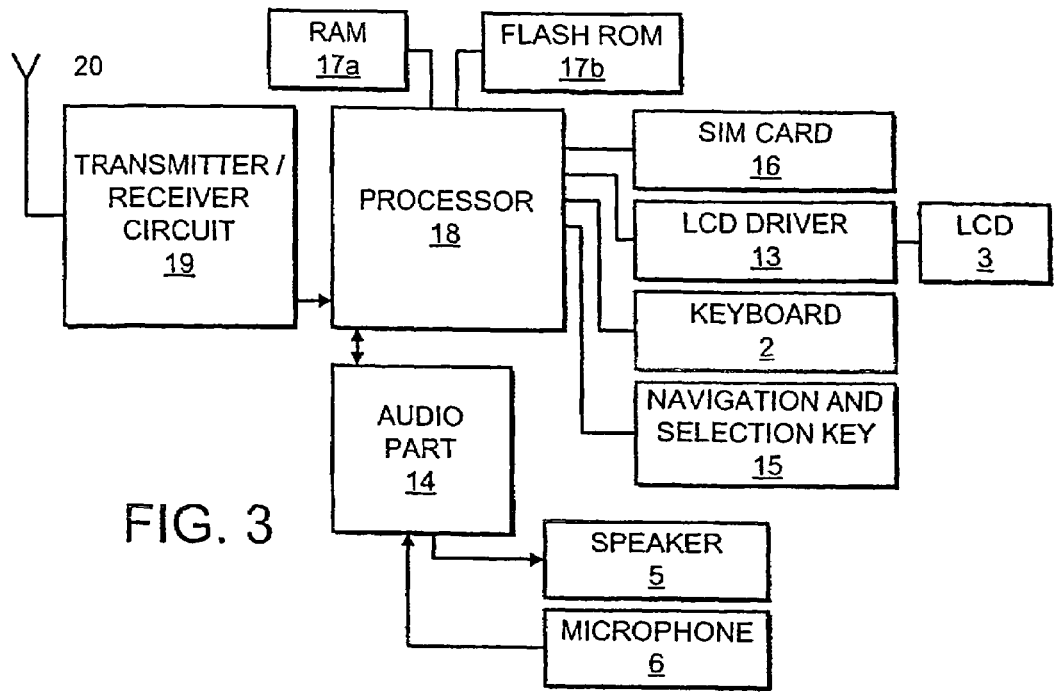

FIG. 3 schematically shows the most essential parts of a preferred embodiment of the phone. These parts being essential to understand the invention. The preferred embodiment of the phone of the invention is used in connection with a GSM network, but, of course, the invention may also be applied in connection with other phone networks, such as other kinds of cellular networks and various forms of cordless phone systems or in dual band phones accessing sets of these systems/networks. The microphone 6 records the user's speech, and the analog signals formed thereby are A/D converted in an A/D converter (not shown) before the speech is encoded in an audio part 14. The encoded speech signal is transferred to control 18. The control 18 comprises a processor, which may support software in the phone. The control 18 also forms the interface to the peripheral units of the apparatus, wherein the peripheral units can comprise a RAM memory 17a and a Flash ROM memory 17b, a SIM card 16, the display 3 and the keypad 2 (as well as data, power supply, etc.). The control 18 communicates with a transmitter/receiver 19, e.g., a circuit which is adapted to send/receive a request/respond to/from a telecommunication network. The audio part 14 speech-decodes the signal, which is transferred from the control 18 to the earpiece 5 via a D/A converter (not shown).

The control 18 is connected to the user interface. Thus, it is the control 18 which monitors the activity in the phone and controls the display 3 in response thereto. Therefore, it is the control 18 which detects the occurrence of a state change event and changes the state of the phone and thus the display text. A state change event may be caused by the user when he activates the keypad including the navigation key 10, and these type of events are called entry events or user events. However, the network communicating with the phone may also cause a state change event. This type of event and other events beyond the users control are called non user events. Non-user events comprise status change during call set-up, change in battery voltage, change in antenna conditions, message on reception of SMS, etc.

Accessing Servers from a Cellular Communication Terminal.

Figure 4:
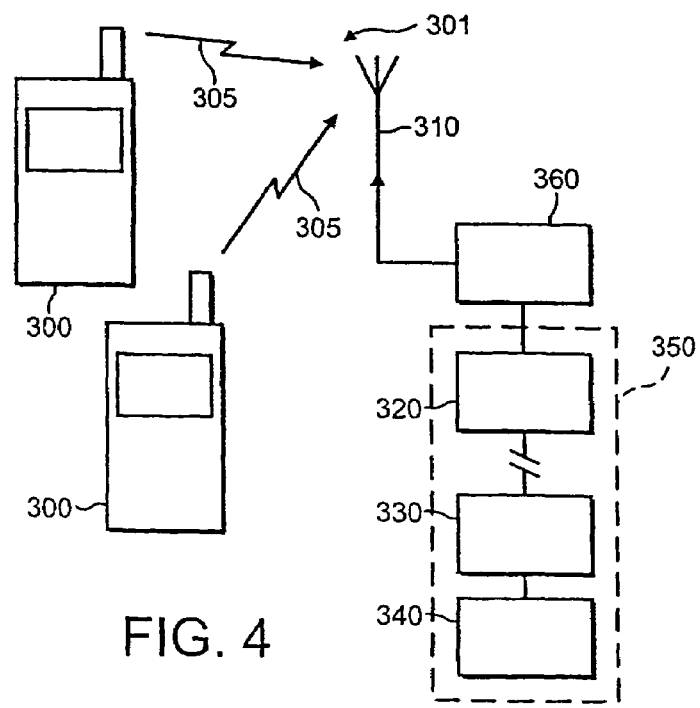

FIG. 4 schematically shows a system 301, comprising a cellular communication terminal 300, a cellular network 310, and a plurality of web servers 320 and 340 in an Internet network 350. The Internet network 350 uses World Wide Web (WWW) protocols. The cellular network 310 is arranged to establish a wireless connection 305 between a plurality of cellular terminals 300 and link 360. Even if the gateway is usually connected to a server to be accessed, it is possible that the gateway may be integrated together with the server to be accessed, as well.

The terminals 300 is able to access a web server 320 via the link 360. In general, the link 360 enables a session for the cellular communication terminal 300 and forwards data packets between the terminal and the web server 320. Thus, the web server 320 receives and/or transmits data packets from/to the terminal 300. The transfer of data packets is often mentioned as pull and/or push. A pull could be described as the terminal using the access point to access a location where the provider information is stored, and might also determine whether it has been updated and to retrieve it if necessary. In some cases it could also be possible to use a push, which could be described as the opposite to pull, i.e., the server maintains address data necessary to transfer updated information to the terminal.

The link 360 in this example is typically a gateway or a proxy, but is hereafter referred to as gateway. A proxy server is a process that allows the user to fetch different types of documents, like WWW, FTP, and GOPHER document. The proxy server can store the documents in a cache memory in the radio terminal. What this means is that when anyone retrieves a document, besides transferring these files to the radio terminal, a copy is also made on the local host. Thus, the next time the user accesses that document, a request is sent to the remote host to see if the page has been updated, and if not, it is read directly from the cache memory. A gateway can be a computer that lies at the intersection of a server to be accessed and a client, and routes traffic from one or several servers to the client. Thus, the function of the gateway is to provide a link between two disparate types of electronic communications such as WAP architecture and Internet architecture.

WAP defines a set of standard protocols that enable communication between mobile terminals and network servers. WAP uses a standard naming model according to which standard Internet URLs are used to identify content on origin servers. It also uses content typing. All WAP content is given a specific type consistent with WWW typing which allows a cellular terminal to correctly process the content based on type. WAP also uses standard content formats and standard communication protocols.

In this embodiment, the gateway 360 translates requests from a WAP protocol stack used by the cellular terminal 300 to a WWW (World Wide Web) protocol stack used by the web server. The web server can for example return WAP content such as WML (Wireless Markup Language) or WWW content such as HTML (HyperText Markup Language). In the later case, a filter is used to translate the WWW content to WAP content, e.g., HTML to WML. The gateway also encodes content sent over the cellular network to the cellular terminal and decodes data sent to it by the cellular terminal.

A Wireless Application Environment which forms an upper layer of the WAP stack includes a browser application, also called a microbrowser. The browser uses wireless markup language (WML) and a lightweight markup language, WMLScript a lightweight scripting language.

The terminals in this type of environment, are preferably cellular communication terminals, like cellular phones. Communication between a cellular terminal 300 and the gateway 360 is according to the Wireless Application Protocol (WAP). WAP specifies an application framework and network protocols for cellular terminals such as mobile telephones, pagers and personal digital assistants. WAP brings Internet content and advanced data services to cellular terminals. WAP can work across differing cellular network technologies and bearer types (GSM, CDMA, SMS). Communication between the web server 320 and protocol gateway 360 is according to WWW protocols.

The cellular terminal differs from a desktop or a portable computer with Internet facilities in that generally it has a less powerful CPU, less memory, restricted power consumption, smaller displays and more limited input devices. The cellular network differs from the Internet network in that it generally has less bandwidth, more latency, less connection stability and less predictable availability. The WAP architecture is optimized for narrow bandwidth bearers with potentially high latency and is optimized for efficient use of device resources.

In order to communicate with the cellular network 310 and to receive and transmit data packets from at least one web server 320 through the gateway 360, the cellular communication terminal 300 comprises a receiver and a transmitter. See also FIG. 3, reference number 19. The terminal 300 further comprises a first memory (see FIG. 3, reference numbers 16 and 17b) provided with an identifier and at least one item. The item is provided with an access point which indicates the location of the server to be accessed, which could be indicated by means of a URL (Uniform Resource Locator) address. In addition, the item can also comprise data packets from earlier sessions which is updated upon a new session to the same access point. The identifier is used to identify the content at the address provided by the server, wherein the server is accessed by sending the identifier to the link to identify which type of content is requested at the server.

Yet another advantageous embodiment is that the terminal can be arranged to give the server access rights to read and/or write to the terminal through first or second links. This can be done by providing the browser with a Wireless Telephony Application (WTA) user agent. The WTA is a part of the standard in WAP, and is an application framework for telephony services. The WTA user-agent could be described as a user-agent similar to a standard WML user-agent with the addition of capabilities for interfacing with mobile network services available to a mobile telephony device, e.g., setting up and receiving phone calls.

Figure 7:
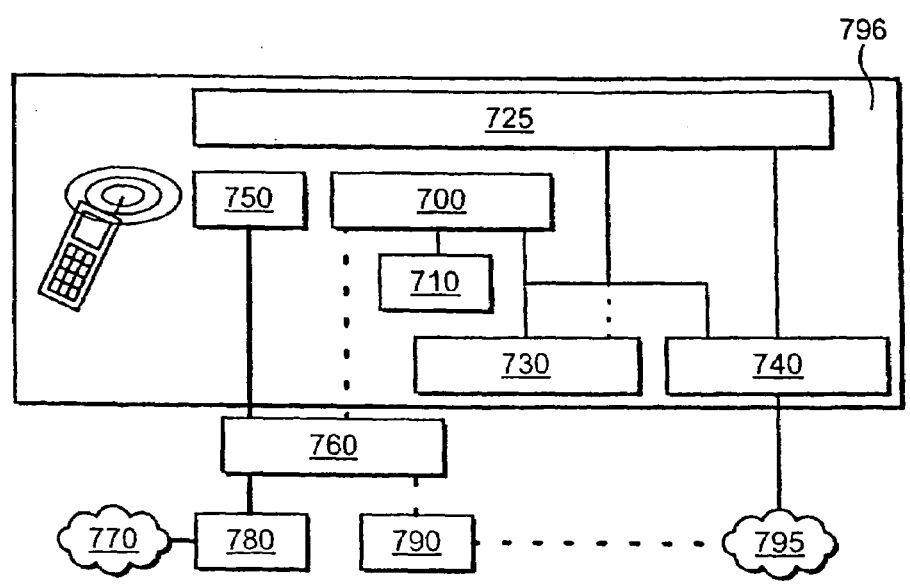
FIG. 7 shows an example of the architecture of a Wireless Telephony Application (WTA) framework.

FIG. 7 describes one example of the WTA framework, which is intended to provide an overview of the WTA architecture. FIG. 7 also illustrates how a WTA user-agent, the repository (persistent storage) and WTAI (telephony application interface) interact with each other through a man-machine interface (like a display/keyboard/logical indicators) and other entities in a WTA-capable mobile client. Other entities could also be connected to the man-machine interface and can be device specific features as a phonebook and/or it can be a network layer like call control. A WAE (Wireless Application Environment) user-agent is able to retrieve its content via a WAP gateway, and provide the interface with actions from a Internet server. It is further possible to provide a firewall 780 between the Internet server and the WAP gateway. In addition, the WTA user-agent is also able to retrieve content from the repository. Further, WTAI ensures that the WTA user-agent can interact with mobile network functions (e.g., setting up calls) and device specific features (e.g., manipulating the phonebook). A WTA server can be accessed through the WAP gateway, and is thought of as a web server delivering content requested by a client. Like an Internet web browser, the WTA user-agent uses URLs to reference content on the WTA server. A URL can also be used to reference an application on a web server (e.g., an script) that is executed when it is referenced. Such applications can be programmed to perform a wide range of tasks, for example generate dynamic content and interact with external entities. The WTA server may also make use of this concept. By referencing applications on the WTA server it is possible to create services that use URLs to interact with the mobile network and other entities (e.g., a voice mail system). Thus, the concept of referencing applications on the WTA server provides a simple but yet powerful model for how to seamlessly integrate services in, e.g., the mobile network with services executing locally in a WAP client.

Also, upon sending data like a response to a request from a server, it is very common to use HTTP POST, which is a popular method for sending data to a server. However, in some cases it would be appreciated to give the server access rights, in order to read content provided in the terminal with or without any user interaction. This could be solved by providing the terminal with a WTA user-agent, since this architecture as shown in FIG. 7 is able to support both read and write functions by using PULL and PUSH commands. One example of a case where it should be interesting to give the server access rights to both read and write, is when making diagnostics in case the phone is not working properly. Therefore, the terminal can be further arranged to send or receive a diagnostic request to/from a server provided with diagnostic means. In this way it can be possible to initiate a test of the functionality of the terminal by means of the diagnostic means which can be allowed to perform read and write to the terminal. The diagnostics can be activated by the phone, which can send a PULL to the server, and the server may identify the phone and the diagnostic request. Thereafter, the server can activate a script, e.g., provided in a WML deck, which establish a connection to phone. When the server is connected to the phone, the server can read what is in the terminal's memory and test the functions of the terminal. If the server detects some erroneous behaviour in the phone, the server is able to correct the errors by writing directly into the terminal. The writing could be done using SMS or similar methods of transmitting data. As an alternative, it could be possible for the server to activate the diagnostics, i.e., without requiring any interaction from the phone. This could be useful in a situation when a telephone provider has discovered some unwanted behavior of a particular phone model. Thus, instead of waiting on all phones to send their PULL, the server reads and writes the wanted amendments to the phone. This is done by doing an asynchronous PULL, i.e., a PULL which is not user initiated. This could, e.g., be a service loading mechanism. Also, when the browser is provided with WTA, the problems regarding security and privacy in the terminal (phone) are taken care of, since this is already build in as a part of WTA.

Figure 8:
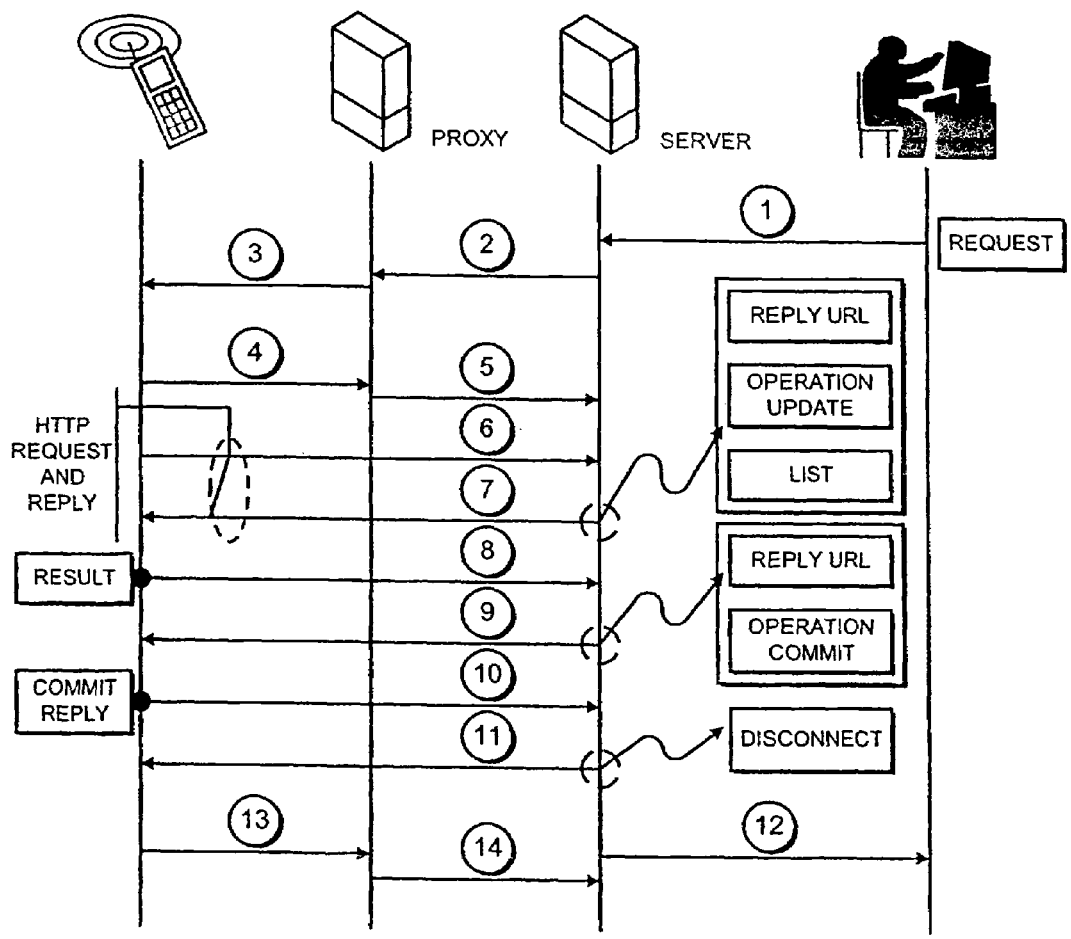
FIG. 8 illustrates an example of using diagnostics according to the present invention.

This above mentioned example of using diagnostics is illustrated in FIG. 8. In FIG. 8 shows a situation where an operator have access to a list of clients, having access to the operators services, e.g., a server provided by the operator. In this example the operator would like to perform diagnostics of a client, i.e., a terminal such as a cellular phone provided with a WTA user agent as shown in FIG. 7. As a first step, the operator initiates a request, 1, by sending a PUSH to perform a diagnostic test of the client. The request is first sent to a server, which accepts the request and sends an indication to link (Proxy), 2, that the client needs a diagnostic test. Except the indication of the request, this indication may also comprise a URL of the server and a dial string. The link forwards the request to the client via one-way SMS, 3. If the client is engaged in a call the request is queued. Otherwise, the client automatically performs an authentication of the request and informs the link that a data call is required, 4. The link verifies the client and establishes a data connection to the server, 5. When the data call is established, the client automatically performs an PULL request for the provisioning information, 6. The server authenticates the client and sends a PUSH command to perform the diagnostic test, and correct any eventual errors, 7. The PUSH command is executed in the client to perform the diagnostic test and sends the result of the operation to the server using PULL, 8. The server verifies the result, and then form a correction request for correct any possible errors, and sends this to the client as an PUSH reply, 9. The client executes the correction request, and sends the result of the operation to the server using PULL, 10. The server replies with a disconnect request to the client, 11. The server updates the originating network element that the diagnostic test has been performed, 12. The client terminates the session and data connection, 13. Finally, the link terminates the connection to the server, 14, and the diagnostic test is finished.

Also, an advantageous embodiment of the present invention is that the content in the item can comprise a script, which is arranged to provide provisions for accessing servers through the link. The script can activate or download linking applications from a gateway, i.e., an application which makes it possible to receive and/or transmit different types of data packets between the server and the terminal. For example, the different types of data packets can be a particular text format, software programs, picture formats. This allows the processing power of the terminal to be restricted, allows a standard WAP browser to be used and provides flexibility for new features. This can be done by creating extensions to WML and WML script. Thus, the script can make it possible to access data packets, which might not be supported by the software in the terminal, by downloading the appropriate application, supporting the type of data format, directly to the terminal. In general, the data packets, can be data (content) stored or generated at an origin server 320. The content of the data packet is typically displayed or interpreted by the client.

It is further possible to have one or more linking applications in the terminal from the beginning, i.e., to provide the linking application in the terminal before establishing a connection to a gateway. This is typically done in the manufacturing process of the terminal, wherein the linking application can be a software program controlling the access to the server.

Figure 6A:
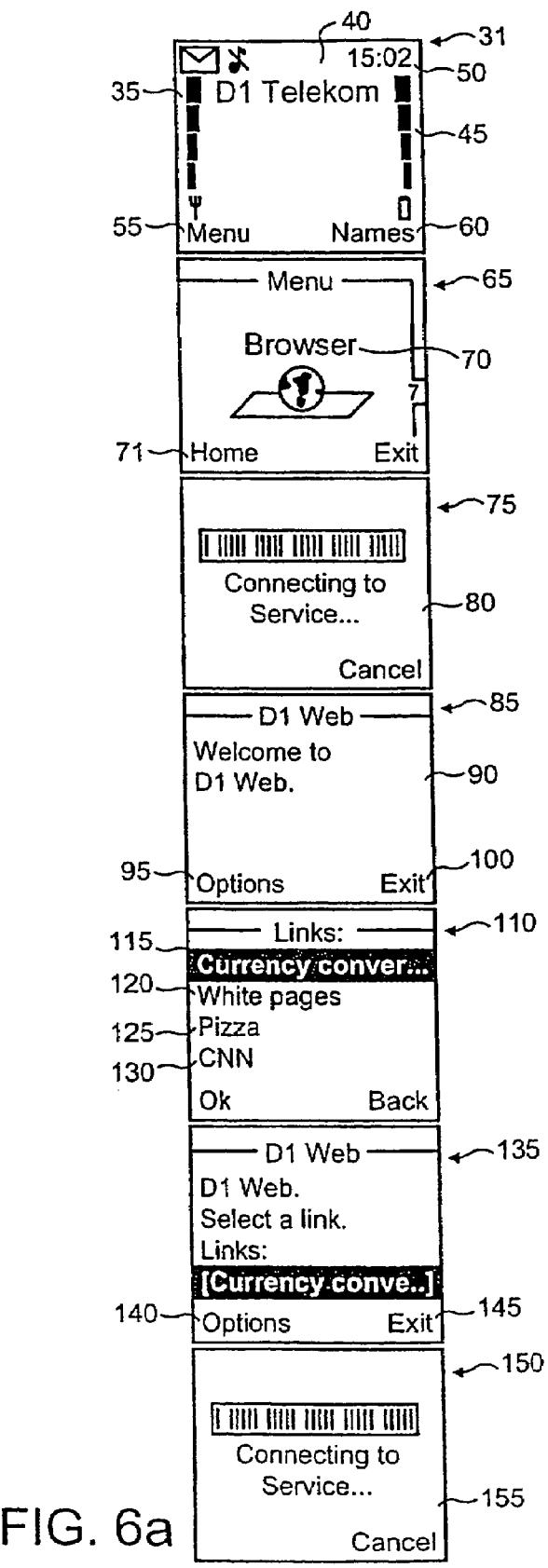
FIGS. 6*a–c* show an example of a user interface in a phone according to the present invention.
Figure 6B:
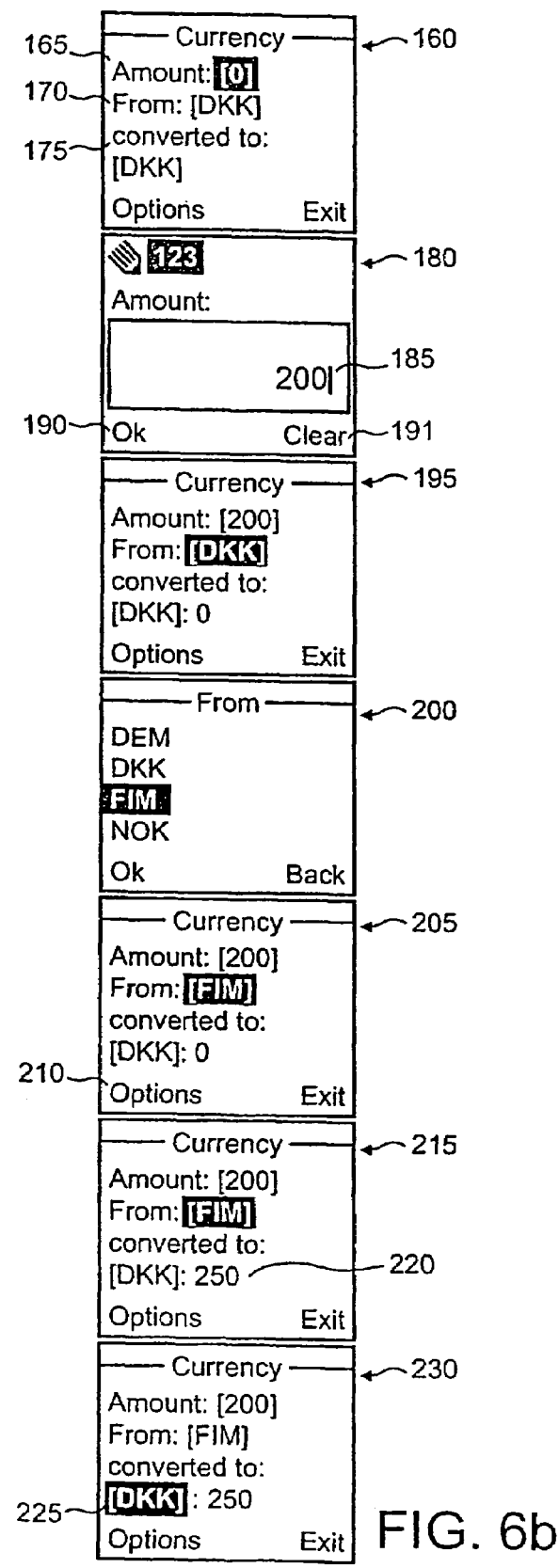
Figure 6C:
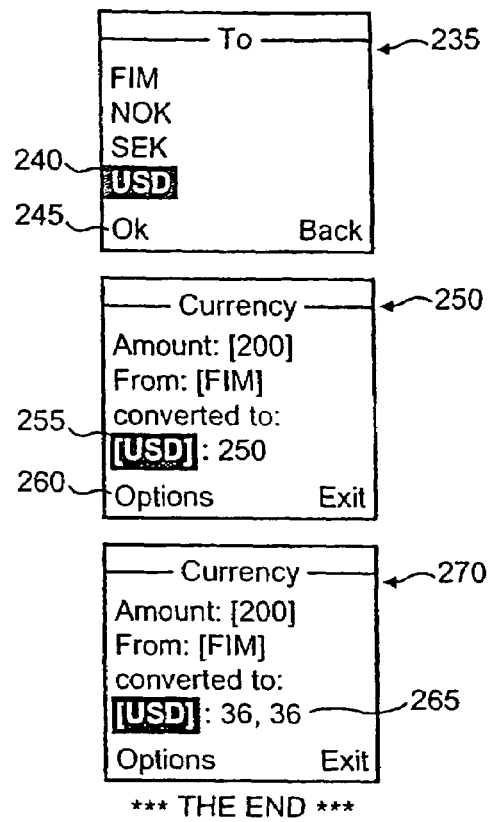

As mentioned before, the Wireless Application Environment forms an upper layer of the WAP stack, which includes a browser application. To access different servers the terminal must be provided with a browser application, like a so called microbrowser. The browser application is arranged to establish a session to at least a first gateway by reading the item in the first memory. A user interface is connected to the browser application having a display for displaying content and user input means to control the browser. An example of how the user interface can be displayed during a session is shown in FIGS. 6*a–c*. The input is shown in FIG. 2 as the keypad 2. The browser can be arranged in a ROM memory or on a SIM card, as shown in FIG. 3, reference numbers 17*b* and 16, respectively.

In an another preferred embodiment, the terminal can be provided with a second memory, which is arranged to copy items from a session. Thus, the items from a session can be stored in this second memory. Typically, this second memory can be a cache memory, which means that the items from the latest session can be temporarily saved in the second memory. The cache memory could be identified as the RAM memory 17*a* in FIG. 3. As an alternative, it can also be possible to save the items from a session in a permanent storage memory, which means that the user is able to confirm if the items are going to be saved or deleted. The permanent storage memory could be identified as the SIM card 16 and/or the ROM memory 17*b* as shown in FIG. 3.

In accordance with the present invention, the browser application is arranged dynamically. This means that, if an access point indicates a location to a second gateway 330, which gives access to the server 340, the browser application will automatically activate the transmitter to send a request to the first gateway 360 to access the server 340 through the second gateway 330. This request can comprise the URL address of the server, together with the identifier, identifying the content of the requested content, and that the user will accept to connect to another gateway, in order to reach this address. Thus, this will allow the user to be free from interaction when accessing other servers that is accessed through other links than the first link. Naturally, it can still be possible to enable an authorization confirmed by the user, but this could slow down the user, when he/she is going to browse to a gateway which is not the first gateway. Of course, there might be some gateways which contains a certain risk, upon entering, but in such cases it can be possible for the user to set some security settings in the browser application, in order to minimise the risk of security hazards. An example illustrating how to send and receive data packets from the server is described in more detail with reference to FIG. 5.

The Method for Accessing Servers Through a Cellular Communication Terminal.

Figure 5:
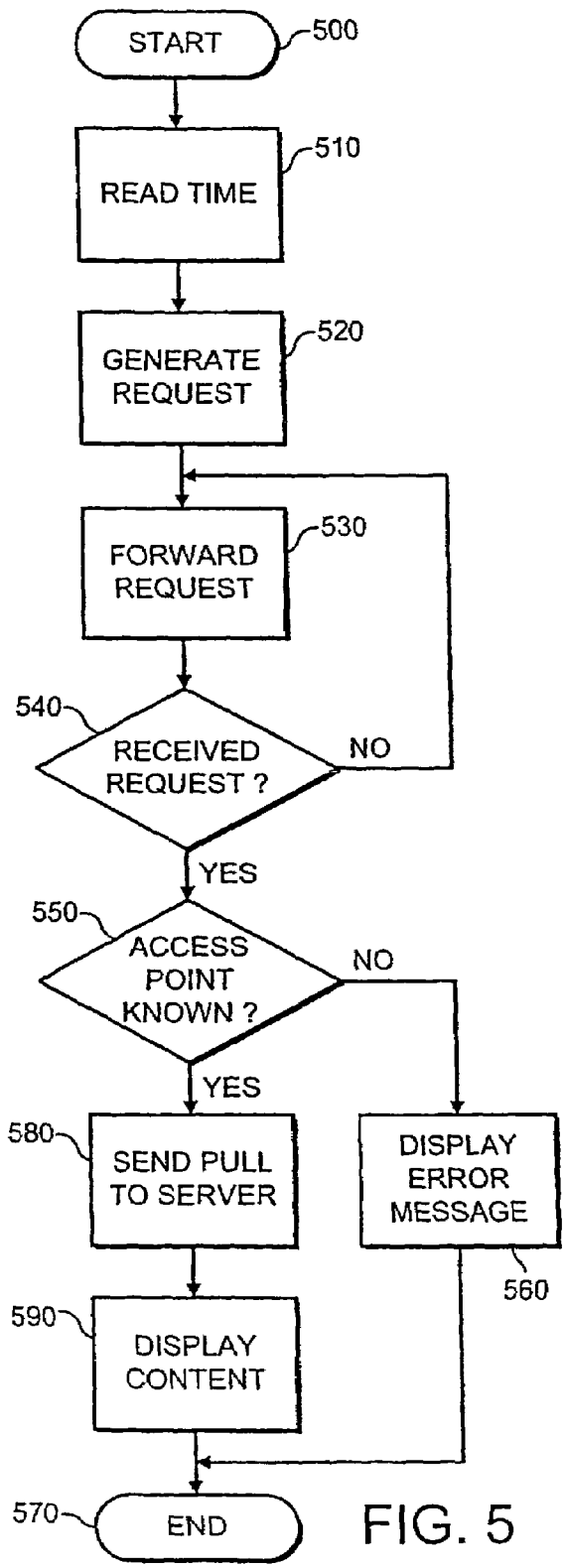
FIG. 5 shows a flowchart over a method for accessing servers from a cellular telecommunication terminal, according to the present invention.

FIG. 5 shows a flow chart, in accordance with the present invention, describing a way of accessing servers through a cellular communication terminal. The cellular telecommunication terminal in this example is the same type as described in FIGS. 2 and 3, and the apparatus is hereafter also referred to as a phone. The phone is provided with a browser application and a first memory which enables the user to browse among different objects on a server. This browsing can be done by using a microbrowser supporting WAP. When the phone is activated and establishes, a wireless connection to a cellular network, e.g., when the phone roams to a new network, "START" 500, it is possible to communicate with different telecommunication services, e.g., WAP related services, i.e., a service which can be accessed from a server to the phone. By using this kind of service, it might be possible to obtain information from a server to the phone, e.g., by using SMS (Short Message Service), or a similar service.

First, the user may select a browser menu on a display controlled by the browser application, which is connected to the first memory. In this browser menu the user can choose to establish a session to a server. To establish the session the user selects the service connected to the server from the menu. The selection is done by, e.g., pressing on one of the softkeys as shown in FIG. 2. Then the browser application reads and identifies the content of an item from the first memory "READ ITEM" 510. This item comprises at least one access point, which indicates the location of the server to be accessed. The item might comprise more content than the access point, e.g., it is possible to have data packets from an earlier session which is updated upon a new session to the same access point. The first memory is also provided with an identifier, which is used to identify the type of content at the server. After reading the item from the first memory, the browser application generates a request, "GENERATE REQUEST" 520. This request comprising information of the access point to be accessed, and the identifier identifying the type of content at the server. The information could for example be a URL address, where the server is located.

The request is then forwarded to the link, "FORWARD REQUEST" 530, in order to establish a session between the link and the terminal. The link could be a gateway or a proxy server, which links the requested information to the correct access point. If the link does not respond to the request, "RECEIVED REQUEST?" 540, e.g., because the link is broken or the terminal does not have coverage to the cellular network, the terminal could receive an error message, which says that a connection to the link could not be established. Then, the user could choose to re-send the request once more, "FORWARD REQUEST" 530.

In an advantageous embodiment of the present invention, the content of the item can comprise a script, which is arranged to provide provisions for accessing servers through the link. The script can activate or download linking applications from a gateway, i.e., an application which makes it possible to receive and/or transmit different types of data packets between the server and the terminal. For example, the different types of data packets can be a particular text format, software programs, different picture formats, etc. This allows a standard WAP browser to be used and provides flexibility for new features. This can be done by creating extensions to WML and WML script. Thus, the script can make it possible to access data packets, which might not be supported by the software in the terminal, by downloading the appropriate application, supporting the type of data format, directly to the terminal. In general, the data packets, is data (content) stored or generated at an origin server. The content of the data packet is to be displayed or interpreted by the client.

It is further possible to have one or more linking applications in the terminal from the beginning, i.e., to provide the linking application in the terminal before establishing a connection to a gateway. This is typically done in the manufacturing process of the terminal, wherein the linking application can be a software program controlling the access to the server.

After the terminal has been connected to the link, the link can control that the access point is correct, "ACCESS POINT KNOWN?" 550. For example, if the user has requested access to a server which no longer exists, is misspelt, or for some other reason is no longer known, the link could transmit an error message. This error message could then be displayed on the terminal, "DISPLAY ERROR MESSAGE" 560, providing the user with information about the error. Then the session could be terminated, either by the user or the link, "END" 570. If the access point is known, the link can send a pull to the server, "SEND PULL TO THE SERVER" 580. A pull could be described as the terminal uses the access point to access a location where the provider information is stored, and might also determine whether it has been updated and to retrieve it if necessary. In some cases it could also be possible to use a push, which could be described as the opposite to pull, i.e., the server maintains address data necessary to transfer updated information to the terminal.

Finally, when the server has sent the requested information to the link, the information will be linked further from the link to the terminal, "DISPLAY CONTENT" 590.

In accordance with the present invention, the browser application is arranged dynamically, i.e., if the access point indicates a location to another link, which gives access to the server, the browser application will automatically activate a transmitter in the terminal to send a request to the first link to access the server through the second link. This request can comprise the URL address of the server, and that the user will accept to connect to the second link, in order to reach this address. Thus, this will allow the user to be free from interaction when accessing other servers that is accessed through other links than the first link. Naturally, it can still be possible to enable an authorization confirmed by the user, when he/she is going to browse to another link which is not the first link.

The User Interface.

With reference to FIGS. 6a, 6b and 6c, an example is shown of how the display in a user interface can act when accessing a server according to the present invention. The user interface may comprise the same elements as shown in FIG. 2, i.e., a keypad 2, a display 3, an on/off button 4, a speaker 5 and a microphone 6. Also, the terminal is provided with control 18 as shown in FIG. 3, which controls the user interface. Starting from FIG. 6a, there is a layout 31 presented on a display in a phone, as shown in FIGS. 2 and 3, which indicates signal strength 35 from the cellular telecommunication network "D1 Telekom" 40, the battery power 45 and a dock showing the time 50 in hours and minutes. Preferably, the display in the phone is an LCD (Liquid Crystal Display) display. The display, can be controlled by the control. The layout 30 presents an example of the phone in idle mode, i.e., when the phone is activated and awaiting an action, e.g., an incoming or outgoing call. In the bottom of the display there are two items which are denoted as "Menu" 55 and "Names" 60. If the user selects "Names" 60, he/she can, e.g., access a built in phone book. If the user selects "Menu" 55, he/she can select among several different menus. The actual selection of features in the bottom of the display, like "Menu" and "Names", can be selected by means of the soft keys disclosed with reference to FIG. 2.

One of the menus can be the next layout 65 called "Browser" 70. If the user chooses to use this menu, he/she can access different telecom related information services, e.g., Internet. One way of accessing this kind of information is to use the Wireless Application Protocol, WAP.

If the user chooses to select "Home" 71, this may lead to the next layout 75, which graphically indicates, "Connecting to Service" 80. This shows an example of how the phone is trying to establish a connection to, e.g., Internet, by sending an access request, through a first gateway, to a server. If a connection is established to the first gateway, some kind of welcome text for a home page might be displayed, "Welcome to D1 Web." 90. If the user selects "Options" 90, a list of selections can be displayed as shown in the following layout 110. For example, the different choices could be "Currency converter" 115, "White pages" 120, "Pizza" 125, "CNN" 130, etc. In this example, the user selects to use the currency converter 115, and browses further to the server providing this service in the next layout 135. In this layout 135, a browser display is shown with the selected item, which is indicated as a link to a service which provides a currency conversion. The user can select to send a request for the chosen item, by using the "Options" 140.

This leads to the next layout 150, as shown in layout 75, which graphically indicates, "Connecting to Service" 155. This shows an example of how the phone is trying to establish a connection to, e.g., the application (currency converter 115), by sending a request to the server. If a connection is established, some kind of information text for the currency converter might be displayed. The following reference numbers refers to FIG. 6b: 160–230. For example, the layout can be provided with different editable fields and selection list placeholders, which in this example are shown in square brackets ([ ]). The selection which is highlighted can indicate a default state of the selection. In these fields, the user can input an amount, "Amount:[ ]" 165, in one currency, "From:[DKK]" 170, converted into another currency, "converted to:[DKK]" 175. When the user is going to enter an amount 185, e.g., 200, on how much he/she would like to convert, the layout may, e.g., change its outlook like it does in layout 180. Thereafter, the user may press Ok 190, whenever he/she is done, or clear the amount by selecting "Clear" 191.

The steps for choosing a first currency to convert from 170, and choosing a second currency to convert to 175, are repeated in the layouts 195–205. Thereafter, the user may select "Options" 210, in layout 205, which in this example activates the calculation of the currency conversion and displays the result 220 in the next layout 215.

If the user would continue with his/hers currency conversion, and choose another currency to convert to, the user selects the option "converted to [DKK]:" 225, which becomes highlighted upon selection, and is shown in layout 230. The following reference numbers refers to FIG. 6c: 235–270. In the next layout 235, a selection list of available currencies is displayed. The user selects, e.g., USD 240, and selects the entry by selecting "Ok" 245. The next layout 250 highlights the selected currency USD 255 to convert to. Thereafter, the user may select "Options" 260, which in this example once again activates the calculation of the currency conversion and the result "[USD]: 36,36" 265 is displayed with the selected information in the next layout 270.

If the currency conversion service is provided on a second gateway, instead of the first gateway, the invention enables the first gateway to automatically forward the request to the second gateway. In this manner, this action can be invisible for the user, and free him/her from any user interaction.

The invention is not limited to the above described and in the drawing shown an example of embodiments but can be varied within the scope of the appended claims. For example, a gateway and a proxy is normally working as a server, and could therefore be working as one unit, i.e., gateway/proxy is also working as a server.

What is claimed is:

1. A cellular communication terminal for accessing servers, said terminal comprising:
    a receiver and a transmitter arranged to receive and transmit data packets from at least one server through a link arranged to forward the data packets between the terminal and the server;
    a first memory comprising an identifier and at least one item, the item is provided with an access point which indicates the location of the server to be accessed, wherein the server is accessed by sending the identifier to the link to identify the content to be accessed at the server;
    a browser application, arranged to establish a session to at least a first link by reading an item from the first memory, and
    a user interface connected to the browser application having display for displaying content received from the server and user input to control the browser application,
    wherein the browser application is arranged dynamically, such that if the access point indicates a location to a second link giving access to the server, the browser application automatically activating the transmitter to send a request to the first link to access the server through second link, in order to allow the user to be free from interaction when accessing other servers that are accessed through other links than the first link.

2. A cellular communication terminal according to claim 1, wherein the terminal is provided with a second memory which copies the item from a session.

3. A cellular communication terminal according to claim 2, wherein the second memory is a cache memory.

4. A cellular communication terminal according to claim 1, wherein the first memory is a SIM card.

5. A cellular communication terminal according to claim 1, wherein the communication terminal uses a desktop computer or a portable computer as the first and/or second link.

6. A cellular communication terminal according claim 1, wherein the item further comprises a script, which provides provisions for accessing servers through the link.

7. A cellular communication terminal according to claim 6, wherein the script activates a linking application.

8. A cellular communication terminal according to claim 1, wherein the terminal includes a linking application, to control the access to different servers.

9. A cellular communication terminal according to claim 1, wherein the terminal gives the server access rights to read and/or write to the terminal through the first or the second link.

10. A cellular communication terminal according to claim 9, wherein the terminal sends or receives a diagnostic request to/from the server provided with diagnostics, in order to initiate a test of the functionality of terminal by means of the diagnostics which is allowed to perform reading and writing to the terminal.

11. A cellular communication terminal according to claim 9, wherein the browser is provided with a Wireless Telephony Application (WTA) user agent, providing an interface supporting security and privacy in the terminal.

12. A method for accessing servers through a cellular communication terminal, the communication terminal comprising a first memory and a browser application, wherein the method comprises the following steps:

reading an item in the first memory and an identifier, by the browser application, the item comprising at least one access point indicating the location of a server to be accessed;

generating a request by the browser application, the request comprising information of the requested access point, and the identifier identifies content of the requested access point;

initiating a session to a first link, by forwarding the request from the communication terminal to the first link, the link sending data packets between the terminal and the server;

identifying the request at the first link; and establishing a session between the terminal and the first link by sending a response from the first link to the terminal;

wherein the browser application is dynamic, such that if an access point indicates a location to a second link giving access to the server, the browser application automatically activates a transmitter by sending a request to the first link, forwarding the request to the second link and provides access to the server, in order to allow the user to be free from interaction when accessing other servers that is accessed through other links than the first link.

13. A method according to claim 12, wherein the item in the session is copied and stored in a second memory.

14. A method according to claim 12, wherein the communication terminal uses a desktop computer or a portable computer as the first and/or the second link.

15. A method according to claim 12, wherein the item further comprises a script, providing provisions for accessing servers through links.

16. A method according to claim 15, wherein the script activates a linking application.

17. A method according to claim 12, wherein the terminal is provided with a linking application, controlling access to different servers.

18. A method according to claim 12, wherein the terminal gives the server access rights to read and/or write to the terminal through the first or the second link.

19. A method according to claim 18, wherein the terminal sends or receives a diagnostic request to/from a server provided with diagnostics, initiating a test of the functionality of the terminal by the diagnostics having access rights to read and write to the terminal.

20. A method according to claim 18, wherein the browser uses a Wireless Telephony Application (WTA) user agent, to form an interface which supports security and privacy in the terminal.

21. A system for accessing servers, the system comprising:

a cellular communication terminal including:

a receiver and a transmitter which receives and transmits data packets from at least one server through a link which forwards the data packets between the terminal and the server;

a first memory comprising an identifier and at least one item, the item being provided with an access point which indicates a location of the server to be accessed, wherein the server is accessed by sending the access point and the identifier to the link to identify the content to be accessed;

a browser application, which establishes a session to at least a first link by reading an item from the first memory; and a user interface connected to the browser application, having a display for displaying content and a user input to control the browser application, a cellular communication network, which establishes a connection between the cellular communication terminal and link, at least one first link, which enables a session for the cellular communication terminal and to forward data packets between the terminal and a server; and at least one server, which receives and/or transmits data packets from/to the terminal;

wherein the browser application is dynamic, such that if the access point indicates a location to second link giving access to the server, the browser application automatically activates the transmitter to send a request to the first link to access the server through the second link, in order to allow the user to be free from interaction when accessing other servers that is accessed through other links than the first link.

22. A system according to claim 21, wherein the terminal has a second memory which copies the item from a session.

23. A system according to claim 22, wherein the second memory is a cache memory.

24. A system according to claim 21, wherein the first memory is a SIM card.

25. A system according to claim 21, wherein the communication terminal uses a desktop computer or a portable computer as the first and/or the second link.

26. A system according to claim 21, wherein the item further comprises a script, which provides provisions for accessing servers through the link.

27. A system according to claim 26, wherein the script is arranged to activate a linking application.

28. A system according to claim 21, wherein the terminal includes a linking application which controls access to different servers.

29. A system according to claim 21, wherein communication between the server and the terminal is in accordance with the Wireless Application Protocol.

30. A system according to claim 21, wherein the terminal gives the server access rights to read and/or write to the terminal through the first or the second link.

31. A system according to claim 30, wherein the terminal sends or receives a diagnostic request to/from the server provided with diagnostics, in order to initiate a test of the functionality of the terminal by means of the diagnostics which is allowed to perform reading and writing to the terminal.

32. A system according to claim 30, wherein the browser is provided with a Wireless Telephony Application (WTA) user agent, in order to form an interface supporting security and privacy in the terminal.

* * * * *